(12) United States Patent
Ozeki et al.

(10) Patent No.: US 8,913,202 B2
(45) Date of Patent: Dec. 16, 2014

(54) INPUT-FUNCTION INTEGRATED LIQUID CRYSTAL DISPLAY DEVICE AND METHOD FOR MANUFACTURING THE SAME

(75) Inventors: Masao Ozeki, Arakawa-ku (JP);
Tokihito Sawada, Arakawa-ku (JP);
Takashi Yuchi, Arakawa-ku (JP);
Kiyoshi Watanabe, Arakawa-ku (JP)

(73) Assignee: OPTREX Corporation, Tokyo (JP)

( * ) Notice: Subject to any disclaimer, the term of this patent is extended or adjusted under 35 U.S.C. 154(b) by 158 days.

(21) Appl. No.: 13/396,105

(22) Filed: Feb. 14, 2012

(65) Prior Publication Data

US 2012/0139874 A1    Jun. 7, 2012

Related U.S. Application Data

(63) Continuation of application No. PCT/JP2010/064097, filed on Aug. 20, 2010.

(30) Foreign Application Priority Data

Aug. 24, 2009 (JP) ................ 2009-193256

(51) Int. Cl.

| | | |
|---|---|---|
| *G02F 1/1335* | (2006.01) | |
| *G02F 1/1343* | (2006.01) | |
| *G02F 1/1333* | (2006.01) | |
| *G06F 3/041* | (2006.01) | |
| *G06F 3/045* | (2006.01) | |
| *G06K 11/06* | (2006.01) | |
| *G08C 21/00* | (2006.01) | |
| *G06F 3/044* | (2006.01) | |

(52) U.S. Cl.
CPC ............ *G06F 3/0412* (2013.01); *G06F 3/044* (2013.01); *G02F 1/13338* (2013.01)
USPC ............ 349/12; 349/139; 349/162; 345/173; 345/174; 178/18.01; 178/18.06

(58) Field of Classification Search
CPC ............ G02F 1/13338; G02F 2001/13312; G02F 2201/50; G02F 2001/133334; G06F 3/044; G06F 3/04883; G06F 3/0416; G06F 3/041; G06F 3/0488; G06F 3/0412; G06F 3/03547; G06F 3/0414; G06F 3/038; G06F 2203/0339; G06F 1/1656; G06F 2203/04106; G06F 2203/04107
See application file for complete search history.

(56) References Cited

U.S. PATENT DOCUMENTS

| | | | |
|---|---|---|---|
| 2007/0165006 A1 | 7/2007 | Sato et al. | |
| 2008/0238883 A1* | 10/2008 | Akiyama | ............... 345/174 |
| 2009/0096761 A1* | 4/2009 | Cho | ............... 345/174 |

FOREIGN PATENT DOCUMENTS

| | | |
|---|---|---|
| CN | 101477420 A | 7/2009 |
| JP | 8-166574 | 6/1996 |
| JP | 2001-42296 | 2/2001 |

(Continued)

OTHER PUBLICATIONS

International Search Report mailed Nov. 16, 2010, issued for PCT/JP2010/064097, filed Aug. 20, 2010.

*Primary Examiner* — Bumsuk Won
*Assistant Examiner* — Angela Davison
(74) *Attorney, Agent, or Firm* — Oblon, Spivak, McClelland, Maier & Neustadt, L.L.P.

(57) ABSTRACT

It is characterized in that there is provided a liquid crystal panel including a pair of transparent substrates having electrodes for liquid crystal display disposed thereon, respectively, the electrodes for liquid crystal display being made of a transparent conductive film and serving as electrodes for liquid crystal display, and a liquid crystal sandwiched between the pair of transparent substrates; and that one of the pair of transparent substrates has an electrode for a projection capacitive sensor disposed on a side thereof with the electrode for liquid crystal display disposed thereon, the electrode for a projection capacitive sensor being made of the same conductive film as the electrode for liquid crystal display and serving as an electrode for a projection capacitive sensor.

4 Claims, 16 Drawing Sheets

(56) References Cited

FOREIGN PATENT DOCUMENTS

| | | |
|---|---|---|
| JP | 2007-122326 | 5/2007 |
| JP | 2008-170837 | 7/2008 |
| JP | 2008-268889 | 11/2008 |
| JP | 2009-3414 | 1/2009 |

\* cited by examiner (a)　　　(b)

(a)    (b)

(a)   (b)

INPUT-FUNCTION INTEGRATED LIQUID CRYSTAL DISPLAY DEVICE AND METHOD FOR MANUFACTURING THE SAME

TECHNICAL FIELD

The present invention relates to an input-function integrated liquid crystal display device wherein an input function which utilizes a projection capacitive sensor is integrated into a liquid crystal display device, and a method for manufacturing the input-function integrated liquid crystal display device.

BACKGROUND ART

Heretofore, a display device and an input device have been fabricated as different devices, and the input device, which is constituted by, e.g. buttons, has been usually disposed in the vicinity of the display device (for example, see FIG. 15). FIG. 15 is an illustrative view showing a conventional example where a display device and an input device are independently disposed. In the conventional example shown in FIG. 15, the display device 70, which includes a liquid crystal panel having a liquid crystal 83 sandwiched between two transparent substrates 81 and 82, and an input device 71, which includes a transparent substrate 91 having electrodes for sensors 89 disposed thereon, are independently disposed as different devices.

When the display device and the input device are disposed as different devices, there is a problem that a large area is required for a space for incorporating the display device and the input device between both devices. When the display device and the input device are disposed side by side, there are a problem that it is impossible to dispose the display device and the input device in succession since it is difficult to bring a display portion (portion where electrodes for liquid crystal display 85 are disposed) and an input portion (portion where the electrodes for sensors 89 are disposed) close to each other, and a problem that it is necessary to manufacture the two devices independently.

As the method for reducing the required area, there is a method for disposing a transparent input device on a display device (for example, see FIG. 16). FIG. 16 is an illustrative view showing another conventional example where the display device and the input device are independently disposed. In the conventional example shown in FIG. 16, the input device 71, which includes a transparent substrate 91 having electrodes for sensors 89 disposed thereon, is disposed, in an overlapping fashion, on the display device 70 (a viewer's side) which includes a liquid crystal panel having a liquid crystal 83 sandwiched between two transparent substrates 81 and 82.

As the transparent input device, a resistance film type, a surface capacitive type, a projection capacitive type, a surface acoustic wave type, an optical type and the like have been proposed. However, even in the case of adopting such a method for disposing a transparent input device on a display device, it is necessary to independently dispose the input device, which causes a problem in that the cost is high.

In order to solve the problem caused by disposing independently the display device and the input device, a method for integrating the display device and the input device has been proposed.

Patent Document 1 discloses a method for fabricating a display portion and an input portion on a single substrate. Patent Document 1 also discloses a liquid crystal display device and a resistance film type touch panel as an example.

Further, Patent Document 2 discloses a method for simultaneously fabricating touch type sensors in a process for fabricating a TFT for a TFT (Thin Film Transistor) liquid crystal display.

Further, Patent Document 3 discloses a method for realizing a liquid crystal display device with a touch function by disposing photosensors for detecting light, on a peripheral portion of a liquid crystal display device (peripheral portion close to a display portion corresponding to touch keys).

Further, Patent Document 4 disclose a method for integrating a display device and an input device by forming a pixel circuit in a display portion and a sensing circuit for detecting capacitance in a sensing area. This document discloses a method wherein a change in the thickness of a liquid crystal layer caused by a load given by a finger is detected as a change in capacitance by the sensing circuit.

PRIOR ART DOCUMENTS

Patent Documents

Patent Document 1: JP-A-8-166574
Patent Document 2: JP-A-2001-42296
Patent Document 3: JP-A-2008-170837
Patent Document 4: JP-A-2009-3414

DISCLOSURE OF INVENTION

Technical Problem

However, when a resistance film type touch panel as disclosed in Patent Document 1 and a display portion of a liquid crystal display device are fabricated by using a single substrate, the substrate is required to be mechanically deformable for switching operation. In other words, the thickness of a substrate for touch with a finger is required to be reduced. This causes a problem in that the yield in quantity production of liquid crystal display devices lowers, and the production cost increases accordingly.

The methods disclosed by Patent Document 2 and Patent Document 4 have the same problem as Patent Document 1 in that the thickness of a substrate for touch with a finger is required to be reduced since, a change in the thickness of a liquid crystal layer caused by a load given by a finger is detected as a change in capacitance by a sensor.

Further, the method disclosed by Patent Document 3 is a method for detecting a touched position (which touch key is touched) by detecting a current and outputting the value of the detected current, the current being generated when external light is entirely or partially blocked by a touching action on display corresponding to a touched key. There is a problem of being difficult to properly set the detection level since it is necessary to set the detection level according to the brightness in an ambient environment where photosensors also detect light in the ambient environment.

It is an object of the present invention to provide an inexpensive and compact input-function integrated liquid crystal display device (which needs no extra parts required for disposing a display portion and an input portion), and a method for manufacturing the input-function integrated liquid crystal display device.

Solution to Problem

The input-function integrated liquid crystal display device according to the present invention is characterized to include a pair of transparent substrates having electrodes for liquid crystal display disposed thereon, respectively, the electrodes for liquid crystal display being made of a transparent conductive film and serving as electrodes for liquid crystal display; a liquid crystal sandwiched between the pair of transparent substrates; and one of the pair of transparent substrates having an electrode for a projection capacitive sensor disposed on a side thereof with the electrode for liquid crystal display disposed thereon, the electrode for a projection capacitive sensor being made of the same conductive film as the electrode for liquid crystal display and serving as an electrode for a projection capacitive sensor.

In the input-function integrated liquid crystal display device, at least one of the pair of transparent substrates may have an electrode for noise cut-off disposed thereon between the electrode for a projection capacitive sensor and the electrodes for liquid crystal display.

In the input-function integrated liquid crystal display device, an area where the electrode for a projection capacitive sensor is disposed may have a fixed mark printed thereon such that a viewer can recognize that the area is a position to be sensed.

In the input-function integrated liquid crystal display device, the electrode for a projection capacitive sensor may be disposed outside a sealing member which seals the liquid crystal, and the other transparent substrate having no electrode for a projection capacitive sensor disposed thereon may be configured such that a portion of the other transparent substrate opposing to the electrode for a projection capacitive sensor is lacking.

In the input-function integrated liquid crystal display device, the electrode for a projection capacitive sensor may be disposed so as to surround a portion of its corresponding electrode for liquid crystal display.

In the input-function integrated liquid crystal display device, the electrode for a projection capacitive sensor may be disposed so as to be close to a portion of a peripheral portion of its corresponding electrode for liquid crystal display.

The method for manufacturing the input-function integrated liquid crystal display device according to the present invention is directed to a method for manufacturing an input-function integrated liquid crystal display device, which integrally includes a liquid crystal display device and an input device in the form of a projection capacitive sensor, the liquid crystal display device including a liquid crystal panel constituted by a pair of transparent substrates having electrodes for liquid crystal display disposed thereon, respectively, the electrodes for liquid crystal display being made of a transparent conductive film and serving as electrodes for liquid crystal display, and a liquid crystal sandwiched between the pair of transparent substrates, and is characterized to dispose an electrode for a projection capacitive sensor on a side of one of the pair of transparent substrates having electrodes for liquid crystal display disposed thereon, respectively, the side being a side with an electrode for liquid crystal display disposed thereon, in a step for disposing the electrode for liquid crystal display, the electrode for a projection capacitive sensor being made of the same transparent conductive film as the electrode for liquid crystal display and serving as an electrode for a projection capacitive sensor.

Advantageous Effect of Invention

In accordance with the present invention, it is possible to provide an inexpensive and compact input-function integrated liquid crystal display device.

DESCRIPTION OF EMBODIMENTS

Now, embodiments of the present invention will be described in reference to drawings.

First Embodiment

Figure 1:
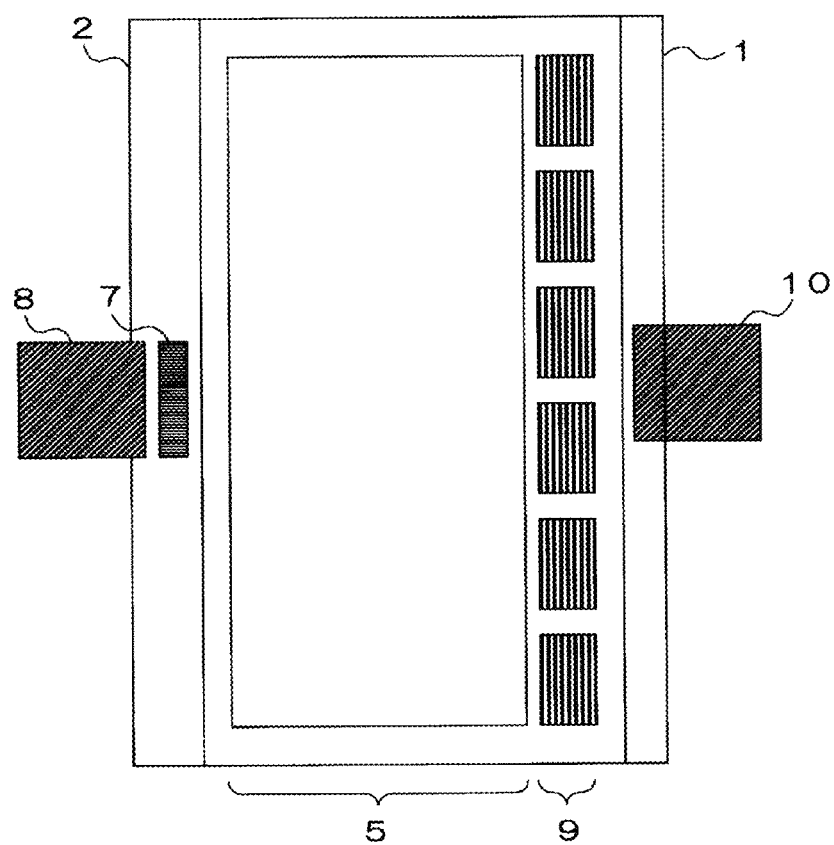
FIG. 1 is a schematic top plan view showing an example of the input-function integrated liquid crystal display device according to a first embodiment of the present invention.
Figure 2:
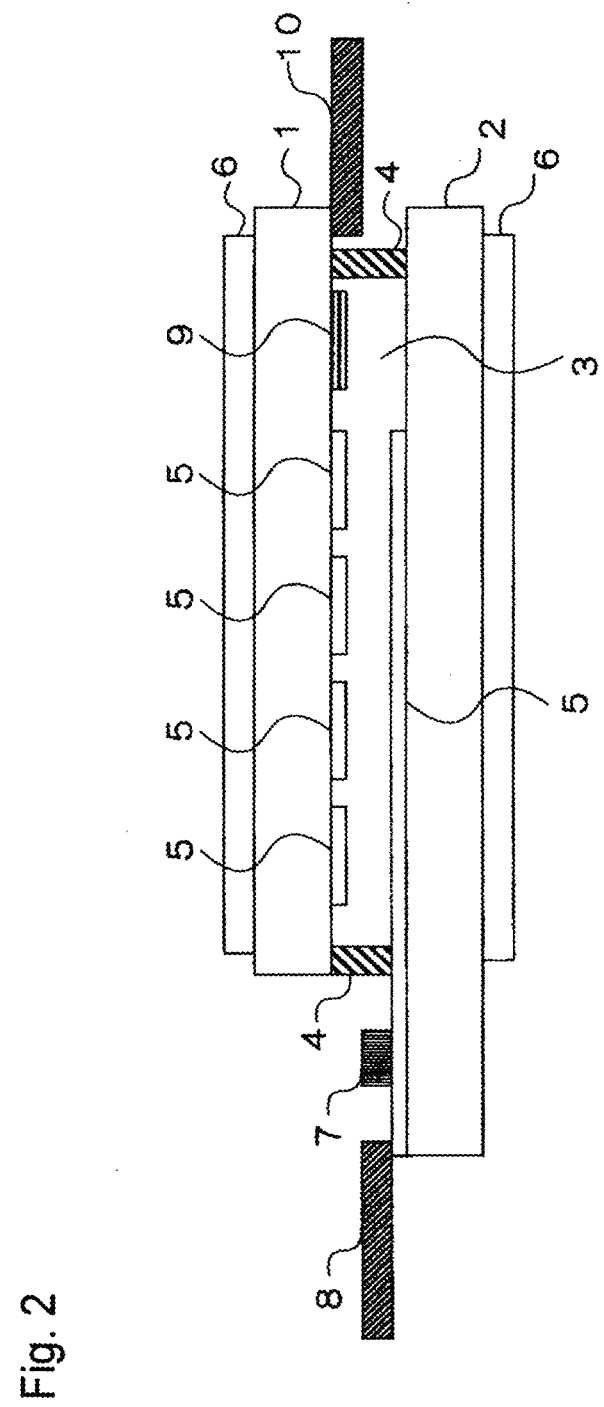
FIG. 2 is a schematic cross-sectional view showing an example of the structure of the input-function integrated liquid crystal display device according to the first embodiment.

FIG. 1 is a schematic top plan view showing an example of the input-function integrated liquid crystal display device according to a first embodiment of the present invention (hereinbelow, simply referred to as the liquid crystal display device). FIG. 2 is a schematic cross-sectional view showing an example of the structure of the liquid crystal display device shown in FIG. 1. The liquid crystal display device shown in FIGS. 1 and 2 includes a liquid crystal display panel which is configured to sandwich a liquid crystal 3 between a pair of transparent substrates 1 and 2 having electrode portions for liquid crystal display 5 disposed thereon, respectively. The liquid crystal 3 is sealed by the respective transparent substrates 1 and 2, and a sealing member 4. Each of the transparent substrates 1 and 2 has a polarizer 6 disposed on an external side.

Each of the transparent substrates 1 and 2 is, e.g. a glass substrate. Hereinbelow, the transparent substrate 1, which is disposed on a side where display is viewed (referred to as the viewer's side) will be referred to as the viewer's side transparent substrate 1, and the transparent substrate 2, which is a substrate opposite to the viewer's side transparent substrate 1, will be referred to as the opposite side transparent substrate 2 in some places.

The electrode portions for liquid crystal display 5 include electrodes for liquid crystal display and circuitous wires therefor, which are formed of a transparent conductive film, such as an ITO (Indium Tin Oxide) film. The circuitous wires for the electrode portions for liquid crystal display 5 are connected to a driving IC 7 disposed on the transparent substrate 2 being, e.g. a glass substrate in the example shown in FIG. 2. The driving IC 7 is connected to a control substrate (not shown) which serves as a source for transmitting image data through a flexible substrate 8.

The kind of the liquid crystal panel of the liquid crystal display device is not particularly limited. The liquid crystal panel may be driven in a TN (Twisted Nematic) mode, a STN (Super-Twisted Nematic) mode, a film-compensated STN mode or a DSTN mode. The liquid crystal panel may employ a liquid crystal having a negative dielectric anisotropy and include vertical alignment films at the interface between the liquid crystal and each of the electrode portions for liquid crystal display 5 (i.e. electrode-forming layers). Either one of an active type panel and a passive type panel may be employed, although a passive type panel is preferred in terms of cost reduction.

In this embodiment, an electrode portion for projection capacitive sensors 9 is disposed on the same side of the viewer's side glass substrate as the side where the electrode portion for liquid crystal display 5 for the viewer's side glass substrate is disposed. The electrode portion for projection capacitive sensors 9 includes electrodes which detect a touched position by sensing a change in capacitance produced by proximity of a conductive body, such as a finger of a person, to a position where the electrode portion for projection capacitive sensors 9 is disposed. The electrode portion for projection capacitive sensors is formed by the same transparent conductive film as the electrode portion for liquid crystal display 5. It should be noted that the electrode portion for projection capacitive sensors 9 is disposed at least in a position close to a portion of a peripheral portion of the electrode portion for liquid crystal display 5.

The electrode portion for projection capacitive sensors 9 is connected to an IC for projection capacitive sensors (not shown). When a finger is brought closer to the electrode portion for projection capacitive sensors 9, capacitance is produced between the finger and the electrode portion for projection capacitive sensors 9. The IC for projection capacitive sensors detects a change in the capacitance. It is not necessary for a finger to be brought into direct contact with the IC for projection capacitive sensors for the purpose of detecting the proximity of the finger by a change in the capacitance. For example, when the viewer's side transparent substrate 1 is a glass substrate, the viewer's side transparent substrate may have a thickness of from 0.3 mm to 3.0 mm.

Although FIG. 2 shows a case where the electrode portion for projection capacitive sensors 9 is connected through a flexible substrate 10 to a substrate or the like with the IC for projection capacitive sensors mounted thereon, the IC for projection capacitive sensors may be mounted on the flexible substrate 10 or be mounted on the viewer's side transparent substrate 1 or the opposite side transparent substrate 2.

Although no backlight is shown in FIGS. 1 and 2, a backlight may be disposed such that not only an area where the electrode portions for liquid crystal display 5 (liquid crystal display portion) but also an area where the electrode portion for projection capacitive sensors 9 (projection capacitive sensor portion) is irradiated with light.

Figure 3:
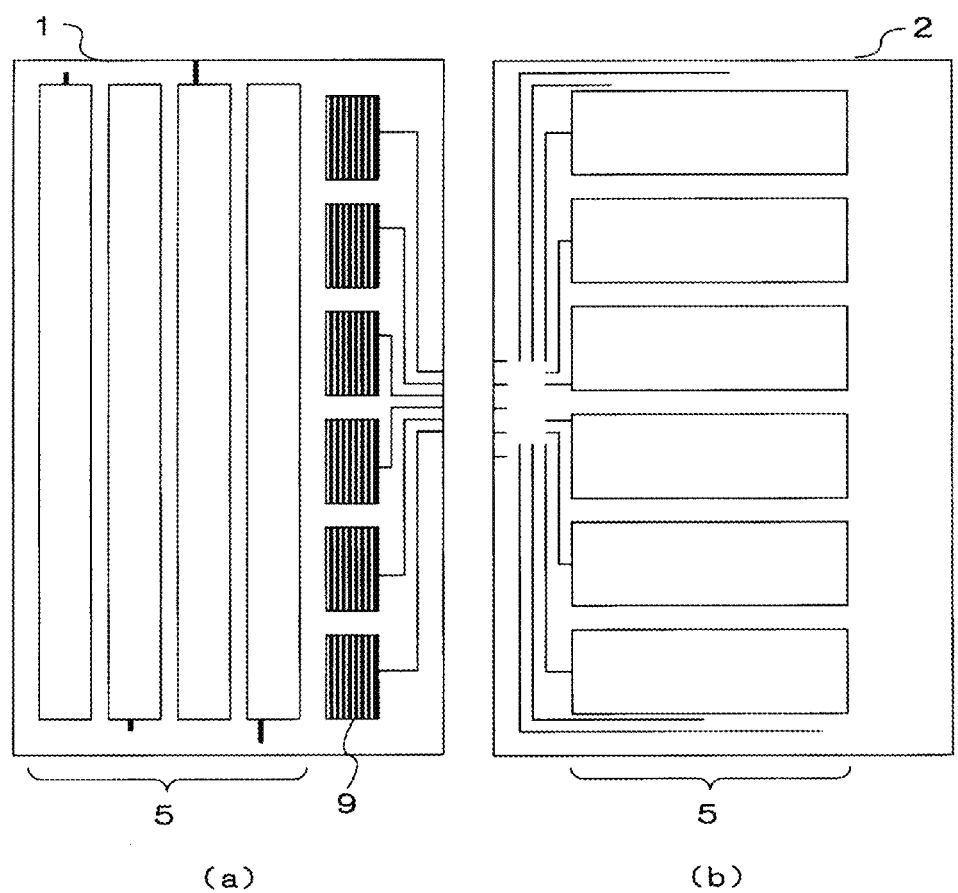
FIGS. 3(a) and (b) are illustrative views showing an example of wires for electrodes on each transparent substrate of the input-function integrated liquid crystal display device according to the first embodiment.

FIGS. 3(a) and (b) are illustrative views showing an example of the wires for electrodes on each transparent substrate of the liquid crystal display device according to this embodiment. FIG. 3(a) is an illustrative view showing an example of the wires for electrodes on the viewer's side transparent substrate 1, and FIG. 3(b) is an illustrative view showing an example of the wires for electrodes on the opposite side transparent substrate 2. Both views are seen from the viewer's side. In other words, FIG. 3(a) is a perspective view. In this example, the transparent substrates shown in FIGS. 3(a) and (b) are overlapped such that the sides with the wires for electrodes are opposed to each other. In other words, the viewer's side transparent substrate 1 may be horizontally moved so as to have an overlapping fashion. In this case, the driving IC 7 and the flexible substrate 8, which serve as a lead-out portion for the wires for the electrodes in the electrode portions for liquid crystal display 5, are positioned on a left side of the transparent substrate 1 shown in FIG. 3(a), and a lead-out portion for the wires for the electrodes in the electrode portion for projection capacitive sensors 9 is positioned on a right side of the transparent substrate 2 shown in FIG. 3(b).

Although the lead-out portion for the wires for the electrodes in the electrode portions for liquid crystal display 5 and the lead-out portion for the wires for the electrodes in the electrode portion for projection capacitive sensors 9 are independently disposed in the example shown in FIGS. 3(a) and (b), both lead-out portions may be disposed at a single flexible substrate by properly wiring. In this example, the circuitous wires for the electrode portion for liquid crystal display 5 disposed on the viewer's side transparent substrate 1 are connected to the circuitous wires on the opposite side transparent substrate 2 through the sealing member 4, which contains conductive beads.

As described above, in accordance with this embodiment, it is possible not only to dispose the liquid crystal display portion and the projection capacitive sensor portion so as to be close to each other but also to inexpensively produce an input-function integrated liquid crystal display device without increasing the number of parts or production steps, by disposing an electrode portion for liquid crystal display 5 and the electrode portion for projection capacitive sensors 9 on such a single substrate. In order to accurately detect the capacitance between the electrode portion for projection capacitive sensors 9 and a finger, it is preferred that no electrode portion for liquid crystal display 5 be disposed on a portion of the opposite side substrate 2 opposing the electrode portion for projection capacitive sensors 9, the opposite side substrate having no electrode portion for projection capacitive sensors 9.

Second Embodiment

Figure 4:
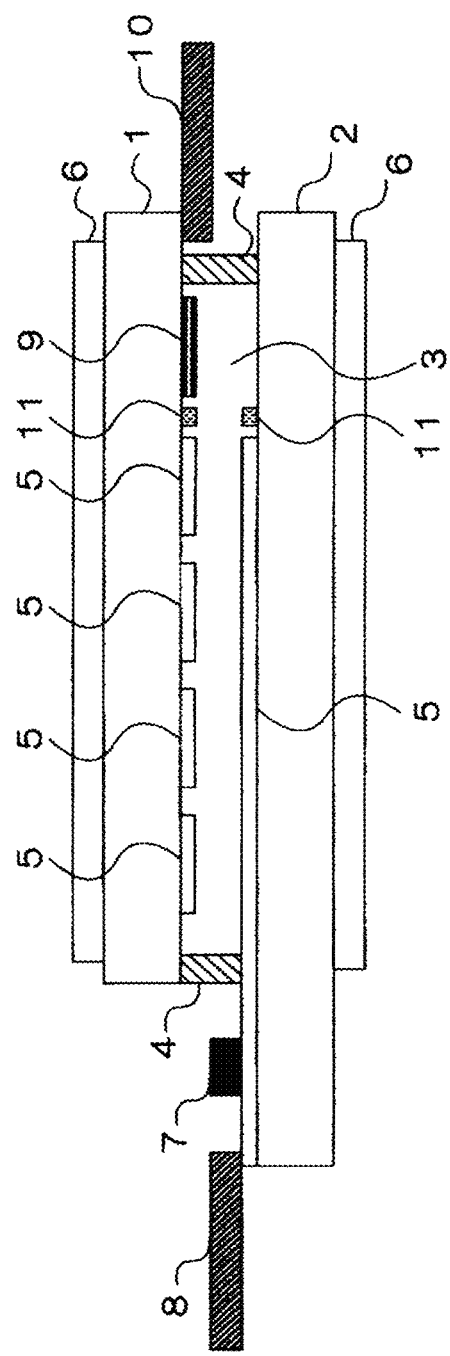
FIG. 4 is a schematic cross-sectional view showing an example of the input-function integrated liquid crystal display device according to a second embodiment.

Now, a second embodiment of the present invention will be described. FIG. 4 is a schematic cross-sectional view showing an example of the liquid crystal display device (input-function integrated liquid crystal display) according to the second embodiment. As shown in FIG. 4, electrodes for noise cut-off 11 are disposed so as to be positioned between an electrode portion for projection capacitive sensors 9 and electrode portions for liquid crystal display 5 in this embodiment.

The electrodes for noise cut-off 11 are electrodes which are connected to ground in order to cut off a noise when the noise is generated in the electrode portion for projection capacitive sensors 9 by application of a voltage across the electrode portions for liquid crystal display 5. The electrodes for noise cut-off 11 may, for example, be made of ITO.

Figure 5:
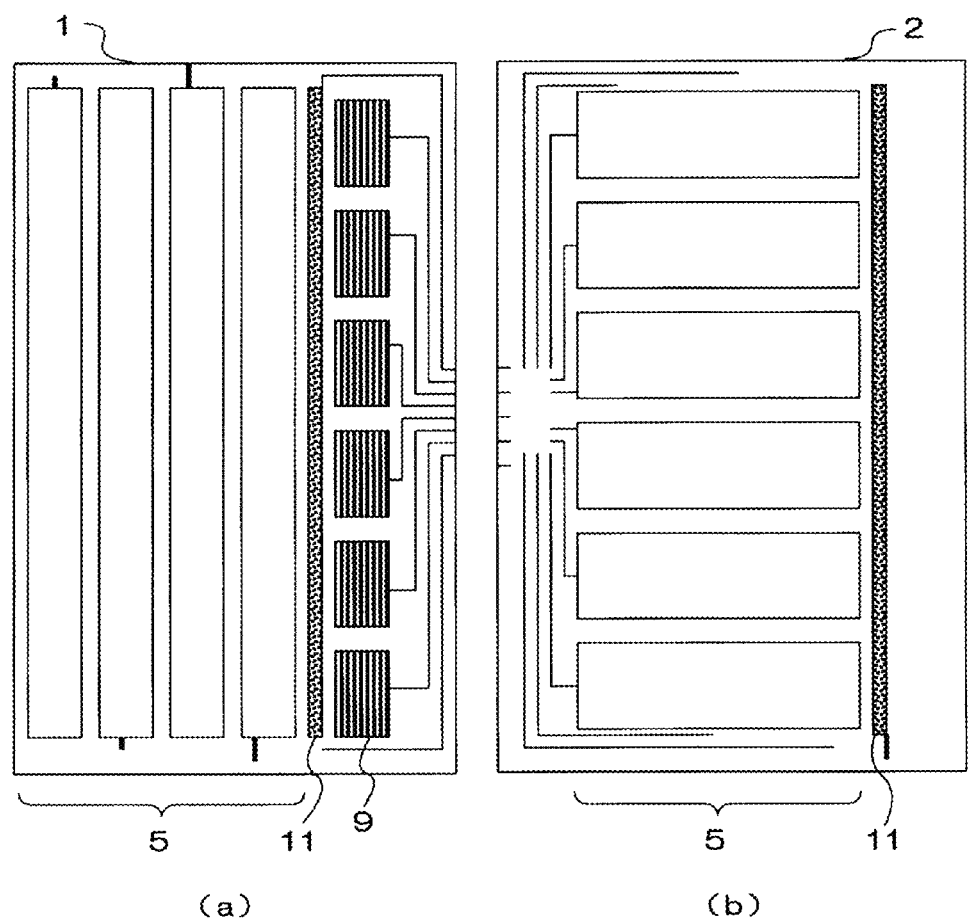
FIGS. 5(a) and (b) are illustrative views showing an example of the wires for electrodes on each transparent substrate of the input-function integrated liquid crystal display device according to the second embodiment.

FIGS. 5(a) and (b) are illustrative views showing an example of the wires for electrodes on each transparent substrate of the liquid crystal display device according to this embodiment. FIG. 5(a) is an illustrative view (perspective view) showing an example of the wires for electrodes on a viewer's side transparent substrate 1, and FIG. 5(b) is an illustrative view showing an example of the wires for electrodes on an opposite side transparent substrate 2. FIGS. 5(a) and (b) are seen from a viewer's side as in FIGS. 3(a) and (b). As shown in FIGS. 5(a) and (b), the electrodes for noise cut-off 11 are disposed between the electrode portion for projection capacitive sensors 9 and the electrodes for liquid crystal display 5. Although it is sufficient that such an electrode for noise cut-off 11 is disposed at least one of the viewer's side transparent substrate 1 and the opposite side transparent substrate 2, it is preferred that such an electrode for noise cut-off 11 be disposed on each of the substrates.

Figure 6:
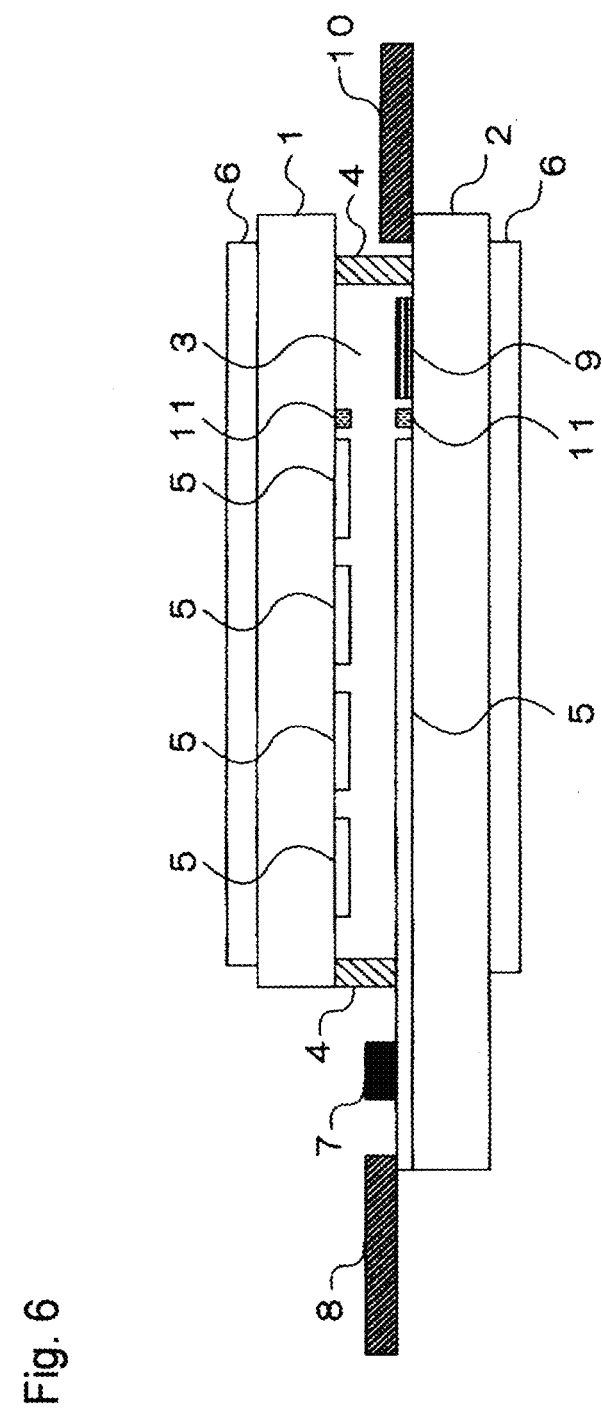
FIG. 6 is a schematic cross-sectional view showing another example of the input-function integrated liquid crystal display device according to the second embodiment.

FIG. 6 is an illustrative view (schematic cross-sectional view) showing another example of the liquid crystal display device according to this embodiment. In this embodiment, an electrode portion for projection capacitive sensors 9 may be disposed on an opposite side transparent substrate 2 as shown in FIG. 6.

Third Embodiment

Figure 7:
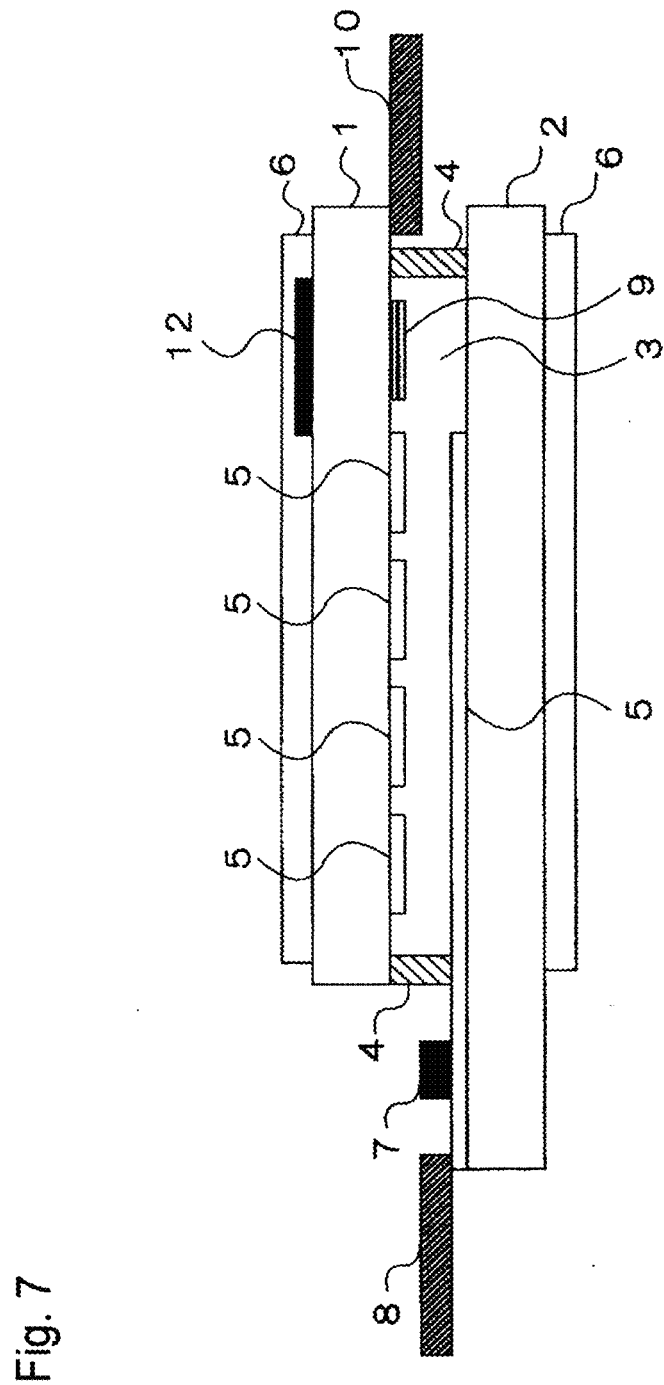
FIG. 7 is a schematic cross-sectional view showing an example of the input-function integrated liquid crystal display device according to a third embodiment of the present invention.
Figure 8:
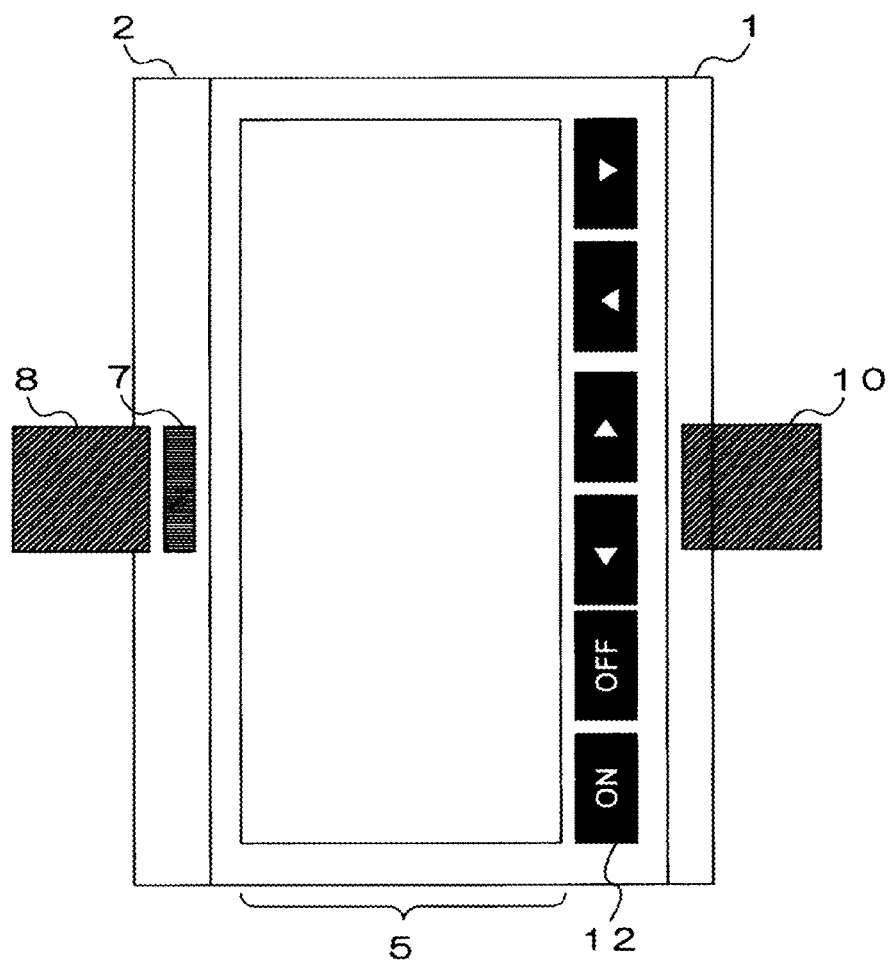
FIG. 8 is a schematic top plan view showing the example of the input-function integrated liquid crystal display device according to the third embodiment.

Now, a third embodiment of the present invention will be described. FIGS. 7 and 8 are illustrative views showing an example of the liquid crystal display device (input-functional integrated liquid crystal display device) according to the third embodiment. FIG. 7 is a schematic cross-sectional view showing the example of the liquid crystal display device according to this embodiment. FIG. 8 is a schematic top plan view showing the example of the liquid crystal display device according to this embodiment.

As shown in FIGS. 7 and 8, a BM printed (black mask printed) portion 12 is formed on a portion of the front side (a viewer's side face) of a viewer's side transparent substrate 1 above sensing areas where an electrode portion for projection capacitive sensors 9 is disposed. It is sufficient that the BM printed portion 12 is printed as fixed marks such that a viewer can recognize that the areas is the sensing areas (areas where touching can be detected). The BM printed portion may be printed not only in the form of black mask but also in a different color.

For example, when the liquid crystal display device is designed such that a line, a frame for shielding a peripheral portion, or the like is printed on the liquid crystal panel itself, it is preferred to form the BM printed portion 12 by utilizing the step for printing such a line or frame. In such a case, it is possible to reduce the required steps. The other features are may be the same as the first or second embodiment.

Figure 9:
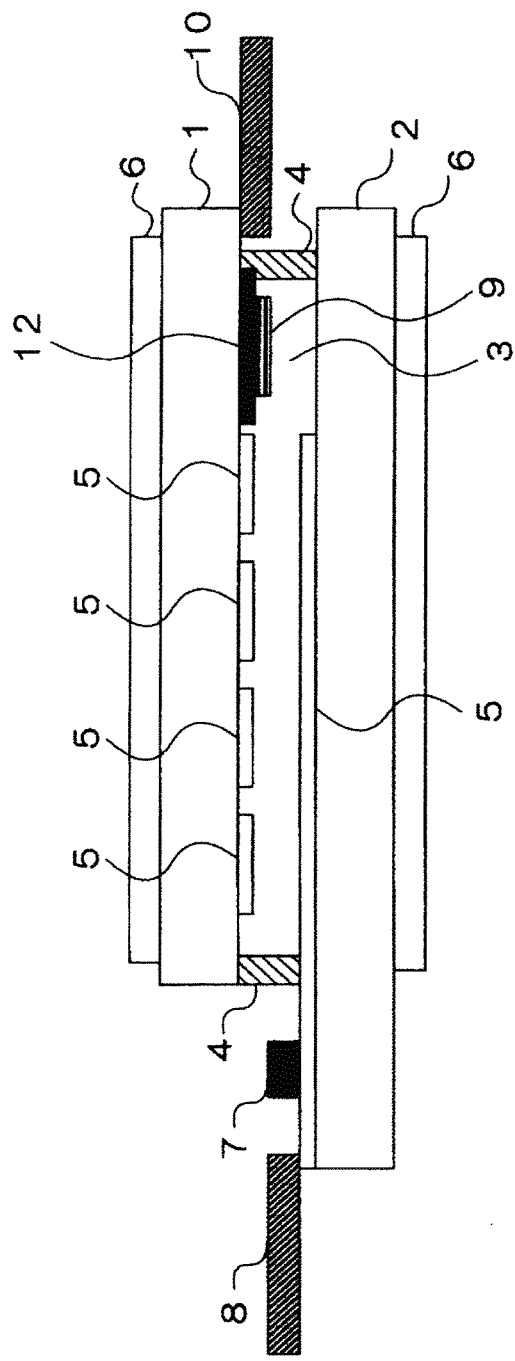
FIG. 9 is a schematic cross-sectional view showing another example of the input-function integrated liquid crystal display device according to the third embodiment.

FIG. 9 is a schematic cross-sectional view showing another example of the liquid crystal display device according to this embodiment As shown in FIG. 9, the BM printed portion 12 may be formed on the rear side of the viewer's side transparent substrate 2, i.e. the side of the viewer's transparent substrate with the electrodes formed thereon.

Figure 10:
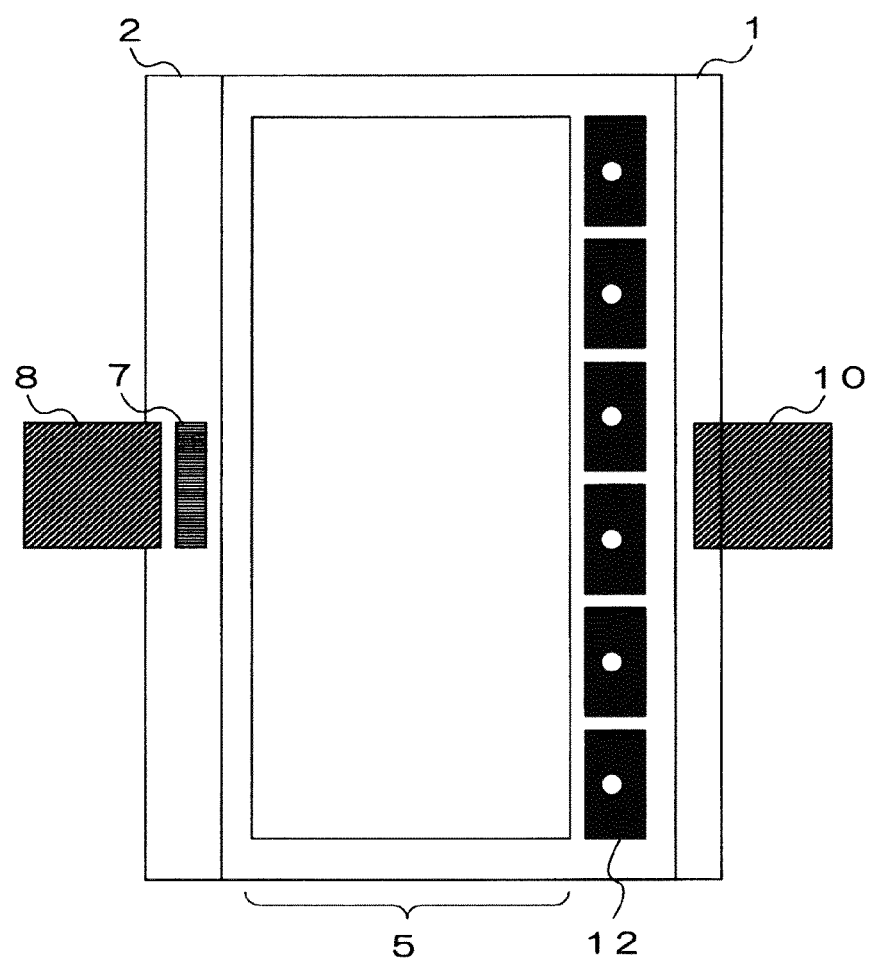
FIG. 10 is a schematic top plan view showing another example of the input-function integrated liquid crystal display device according to the third embodiment.

FIG. 10 is a schematic top plan view showing another example of the liquid crystal display device according to this embodiment. In the example shown in FIG. 10, the BM printed portion 12 is formed such that the respective sensing areas have circular icons unmasked in the form of a fixed mark. In this case, it is possible to irradiate the respective unmasked portions with light from a backlight or the like in order to make a control so as to indicate which position should be touched.

Fourth Embodiment

Figure 11:
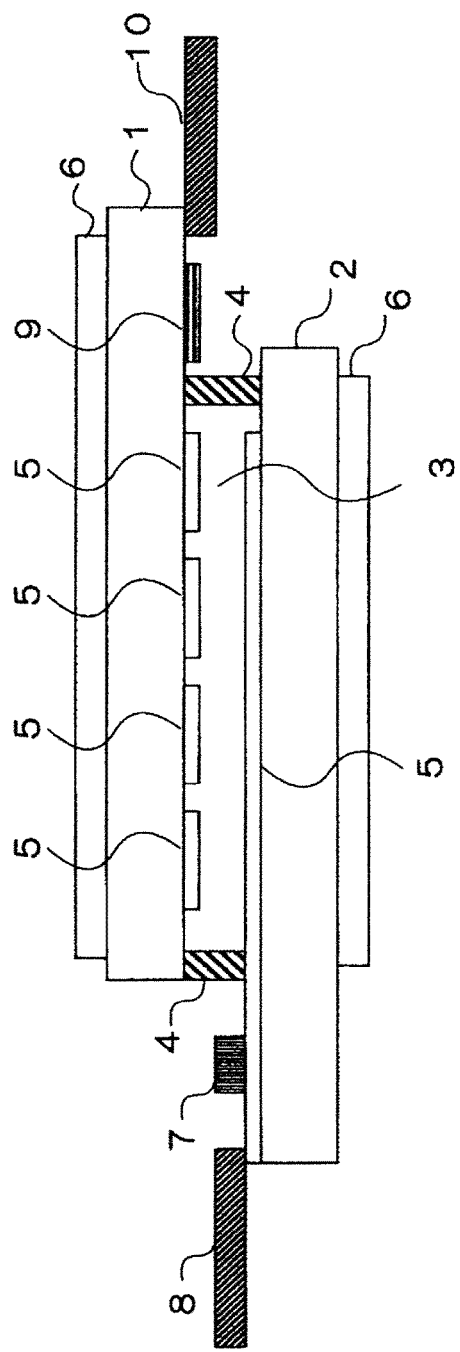
FIG. 11 is a schematic cross-sectional view showing an example of the input-function integrated liquid crystal display device according to a fourth embodiment of the present invention.
Figure 12:
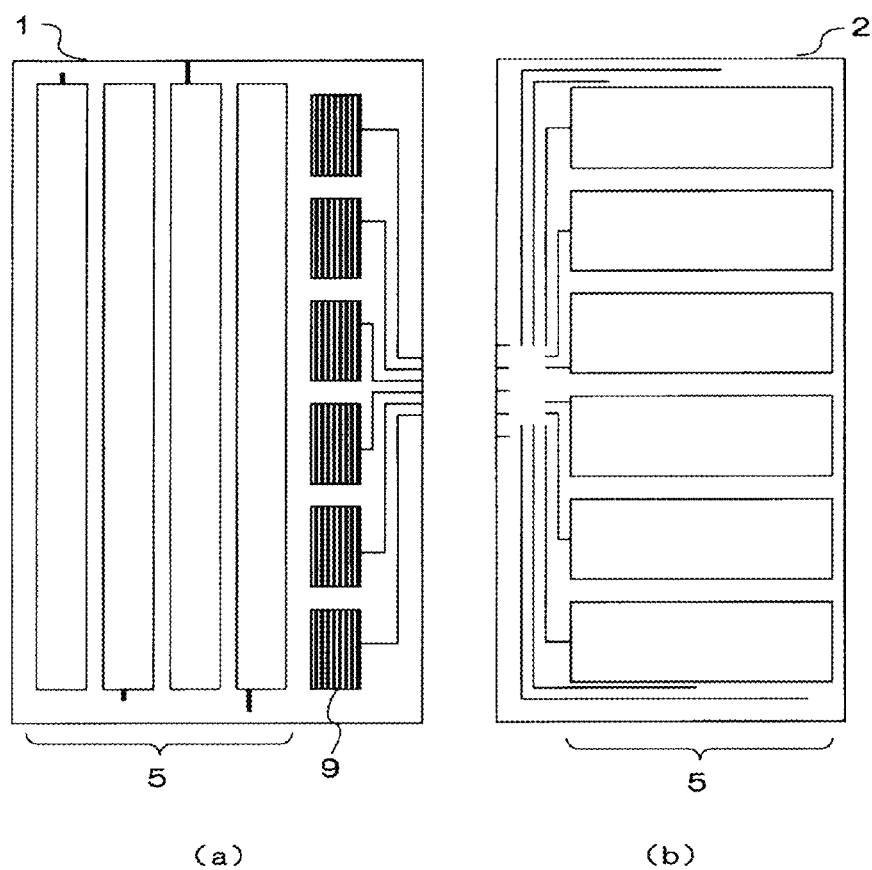
FIGS. 12(a) and (b) are illustrative views showing an example of the wires for electrodes on each transparent substrate of the input-function integrated liquid crystal display device according to the fourth embodiment.

Now, a fourth embodiment of the present invention will be described. FIG. 11 and FIGS. 12(a) and (b) are illustrative views showing an example of the liquid crystal display device (input-function integrated liquid crystal display device) according to the fourth embodiment. FIG. 11 is a schematic cross-sectional view showing the example of the liquid crystal display device according to this embodiment. FIGS. 12(a) and (b) are illustrative views showing an example of the wires for electrodes on each transparent substrate of the liquid crystal display device according to this embodiment. FIG. 12(a) is an illustrative view (perspective view) showing the example of the wires for electrodes on a viewer's side transparent substrate 1, and FIG. 12(b) is an illustrative view showing the example of the wires for electrodes on the opposite side transparent substrate 2. FIGS. 12(a) and (b) are seen from a viewer's side as in FIGS. 3(a) and (b).

In the liquid crystal display device according to this embodiment, an electrode portion for projection capacitive sensors 9 is disposed so as to be positioned outside a sealing member 4 which seals the liquid crystal. Further, the transparent substrate 2 having no electrode portion for projection capacitive sensors 9 disposed thereon is configured so as to lack a portion opposite to the electrode portion for projection capacitive sensors 9. In other words, an area of the viewer's side transparent substrate 1 where the electrode portion for projection capacitive sensors 9 is disposed projects with respect to the opposite side transparent substrate 2, and the transparent substrate 2 is not present in an area opposite to the area of the viewer's side transparent substrate where the electrode portion for projection capacitive sensors is disposed. The other features may be the same as either one of the first to third embodiments.

Since the electrode portion for projection capacitive sensors 9 can have a similar effect to the respective embodiments described above without the opposite side transparent substrate 2 being not present in its corresponding area, it is possible to reduce of the material for the substrates in this case.

Fifth Embodiment

Figure 13:
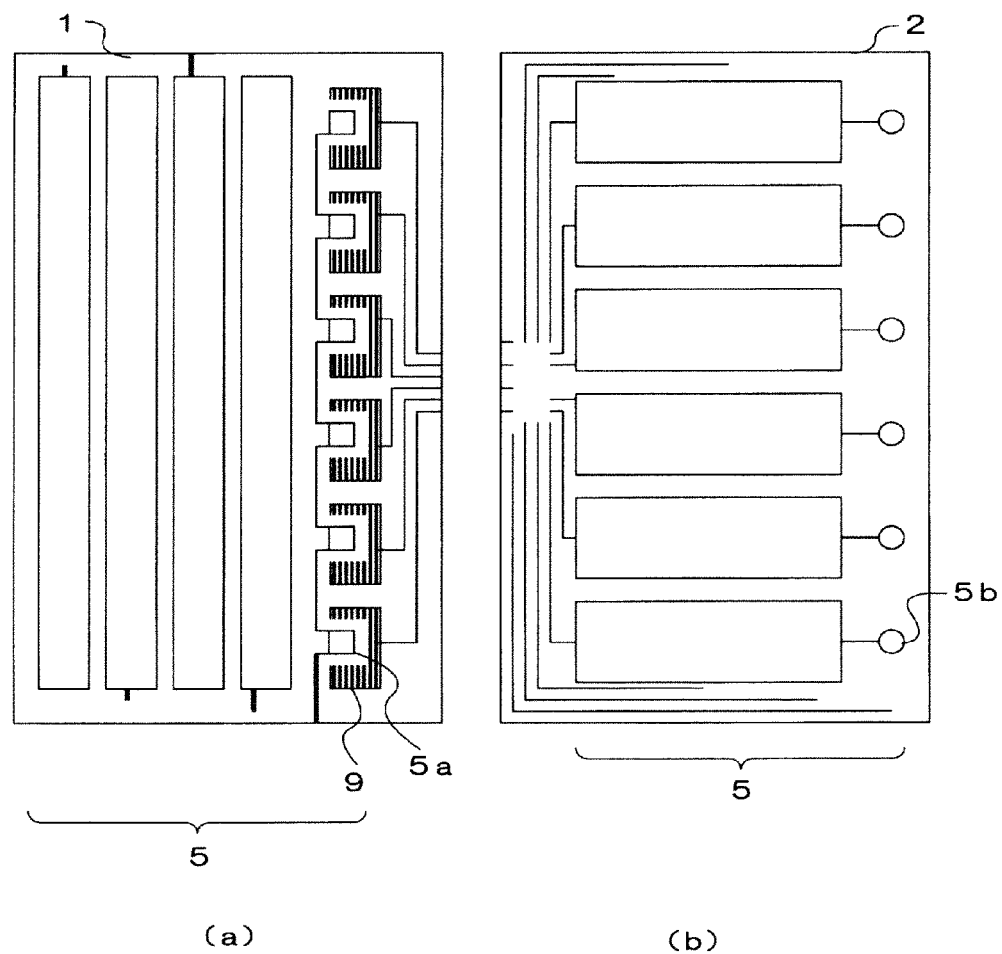
FIGS. 13(a) and (b) are illustrative views showing an example of the wires for electrodes on each transparent substrate of the input-function integrated liquid crystal display device according to a fifth embodiment of the present invention.
Figure 14:
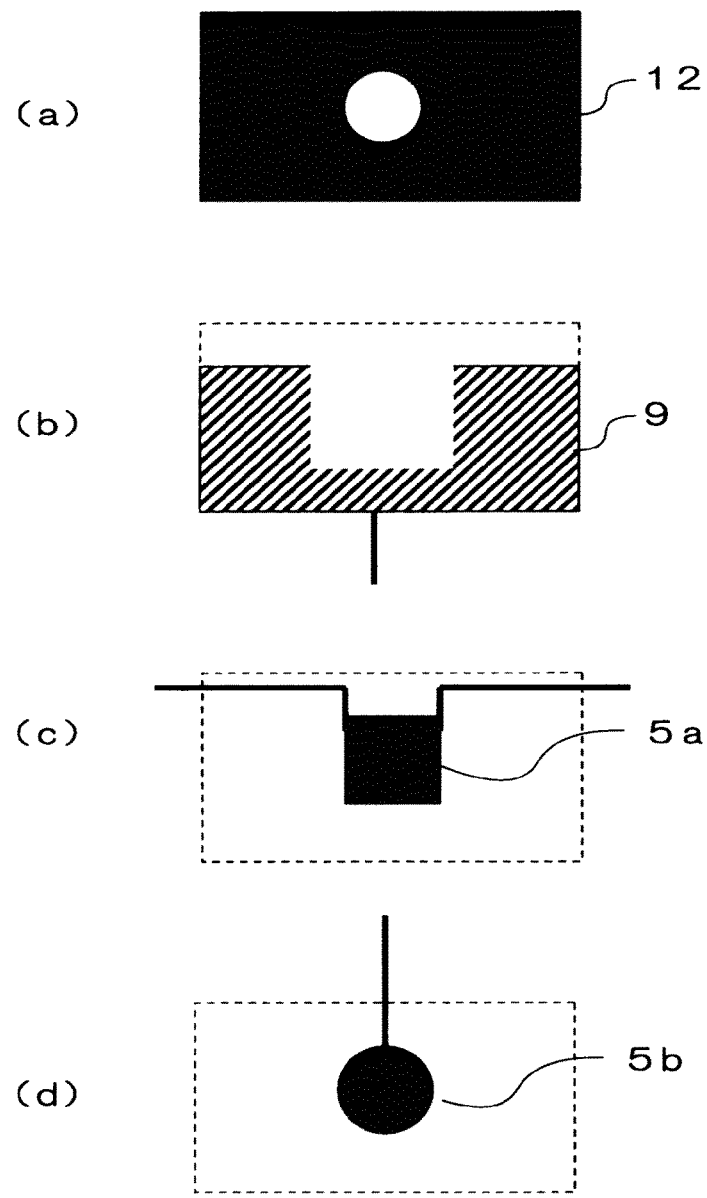
FIGS. 14(a) to (d) are illustrative views showing an example of the formation in a sensing area of the input-function integrated liquid crystal display device according to the fifth embodiment.
Figure 15:
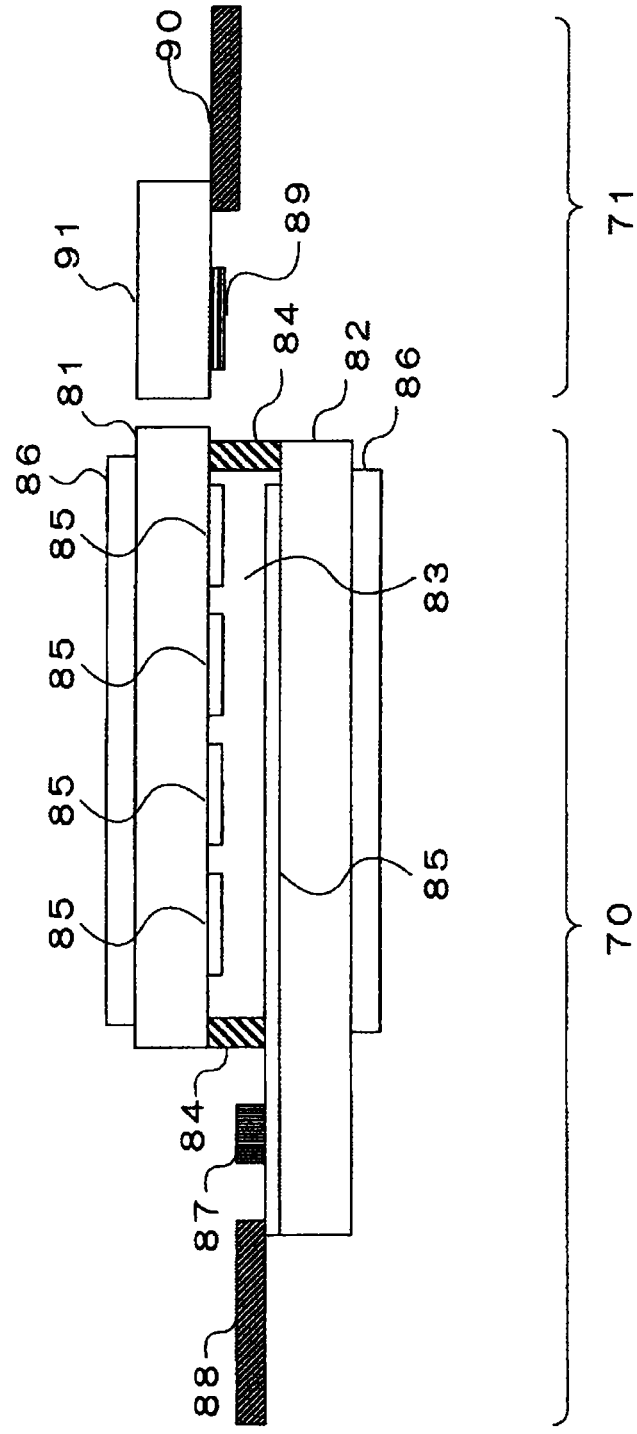
FIG. 15 is an illustrative view showing a conventional example where a display device and an input device have been configured as different devices.
Figure 16:
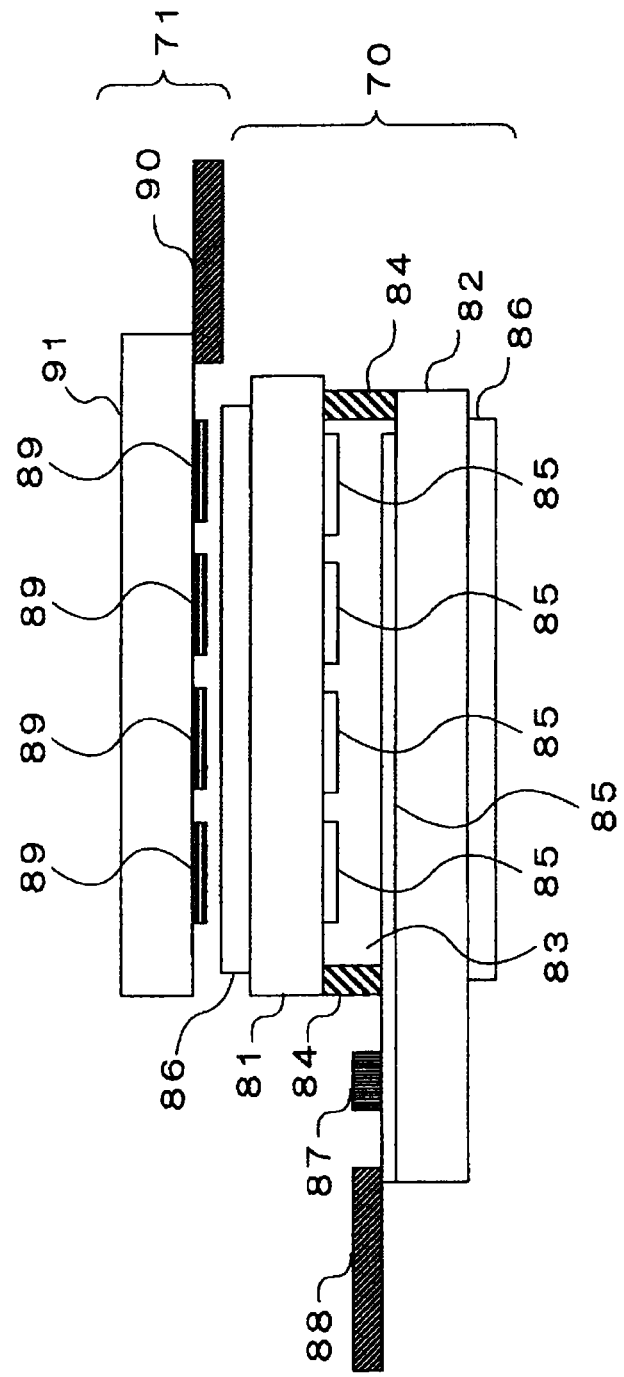
FIG. 16 is an illustrative view showing another conventional example where a display device and an input device have been configured as different devices.

Now, a fifth embodiment of the present invention will be described. FIGS. 13(a) and (b) are illustrative views showing an example of the liquid crystal display device (input-function integrated liquid crystal display device) according to the fifth embodiment. FIG. 13(a) is an illustrative view (perspective view) showing an example of the wires for electrodes on a viewer's side transparent substrate 1, and FIG. 13(b) is an illustrative view showing an example of the wires for electrodes on the opposite side transparent substrate 2. FIGS. 13(a) and (b) are seen from a viewer's side as in FIGS. 3(a) and (b).

In this embodiment, electrodes for an icon to be displayed are disposed in each sensing area. Each of the electrodes 5a and 5b for an icon is a portion of the electrode portions for liquid crystal display 5. For example, the electrode for an icon 5a may be disposed as a portion of an electrode portion for liquid crystal display 5 including electrodes driven as common electrodes, and the electrode for an icon 5b may be disposed as a portion of the electrode portion for liquid crystal display 5 including electrodes driven as segment electrodes.

FIGS. 14(a) to (d) are illustrative views showing an example of the formation of a BM printed portion 12, an electrode portion for projection capacitive sensors 9, an electrode for an icon (common electrode) 5a, and an electrode for an icon (segment electrode) 5b in a sensing area. As shown in FIGS. 14(a) to (d), the electrode portion for projection capacitive sensors 9 may be disposed so as not to be brought into contact with an area, where the electrodes for icons 5a and 5b (as well as circuitous wires therefor) are present, and so as to surround such an area (for example, so as to be lacking so as not to contain such an area plus a (gap portion)), i.e. so as to surround a portion the electrodes for icons in each sensing area in this embodiment. The other features may be the same as either one of the first to third embodiments.

By disposing the electrodes 5a and 5b for an icon in each sensing area, the control of display can be made by liquid crystal driving controlled by voltage application to the electrode portions for liquid crystal 5 in the lacking portion in the BM printed portion 120 in each sensing area. Thus, it is possible to make more flexible display.

INDUSTRIAL APPLICABILITY

The present invention is advantageously applicable to a case where an input function, which can be realized by a touch of a conductive body, is disposed at a position close to a display area of a liquid crystal display device.

This application is a continuation of PCT Application No. PCT/JP2010/064097, filed Aug. 20, 2010, which is based upon and claims the benefit of priority from Japanese Patent Application No. 2009-193256 filed on Aug. 24, 2009. The contents of those applications are incorporated herein by reference in its entirety.

What is claimed is:

1. An input-function integrated liquid crystal display device comprising:
a first transparent substrate and a second transparent substrate having electrodes for the liquid crystal display disposed on both the first transparent substrate and the second transparent substrate, respectively, the electrodes for the liquid crystal display being made of a transparent conductive film and serving as electrodes for the liquid crystal display;
a liquid crystal sandwiched between the first transparent substrate and the second transparent substrate; and
an electrode for a projection capacitive sensor disposed on the first transparent substrate on a side thereof with at least one of the electrodes for the liquid crystal display disposed thereon, the electrode for the projection capacitive sensor being made of the transparent conductive film of the at least one of the electrodes for the liquid crystal display, wherein
at least the first transparent substrate has an electrode for noise cut-off disposed thereon between the electrode for the projection capacitive sensor and the at least one of the electrodes for the liquid crystal display,
the electrode for the projection capacitive sensor is disposed outside a sealing member which seals the liquid crystal; and
the second transparent substrate does not extend to an area opposed to the electrode for a projection capacitive sensor.

2. The input-function integrated liquid crystal display device according to claim 1, wherein an area where the electrode for the projection capacitive sensor is disposed has a fixed mark printed thereon such that a viewer can recognize that the area is a position to be sensed.

3. The input-function integrated liquid crystal display device according to claim 1, wherein the electrode for the projection capacitive sensor is disposed so as to surround a portion of its corresponding electrode for liquid crystal display.

4. The input-function integrated liquid crystal display device according to claim 1, wherein the electrode for the projection capacitive sensor is disposed so as to be close to an electrode disposed at a peripheral position of the electrodes for the liquid crystal display.

* * * * *